United States Patent
Tan et al.

(10) Patent No.: US 10,461,823 B2
(45) Date of Patent: Oct. 29, 2019

(54) APERTURE CONSTRAINT FOR NEW RADIO UPLINK MULTIPLE-INPUT MULTIPLE-OUTPUT

(71) Applicant: Nokia Technologies Oy, Espoo (FI)

(72) Inventors: Jun Tan, Lake Zurich, IL (US); William Hillery, Lafayette, IN (US); Eugene Visotsky, Buffalo Grove, IL (US); Frederick Vook, Schaumburg, IL (US); Nitin Mangalvedhe, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/001,915

(22) Filed: Jun. 6, 2018

(65) Prior Publication Data

US 2019/0140714 A1  May 9, 2019

Related U.S. Application Data

(60) Provisional application No. 62/520,835, filed on Jun. 16, 2017.

(51) Int. Cl.
| | |
|---|---|
| *H04B 7/0456* | (2017.01) |
| *H04B 7/0417* | (2017.01) |
| *H04W 72/02* | (2009.01) |
| *H04L 5/00* | (2006.01) |
| *H04B 7/06* | (2006.01) |
| *H04B 7/0404* | (2017.01) |

(52) U.S. Cl.
CPC .......... *H04B 7/0473* (2013.01); *H04B 7/0417* (2013.01); *H04B 7/0469* (2013.01); *H04B 7/0695* (2013.01); *H04L 5/0051* (2013.01); *H04W 72/02* (2013.01); *H04B 7/0404* (2013.01); *H04B 7/0626* (2013.01)

(58) Field of Classification Search
CPC ...... H04B 7/0456; H04B 7/046; H04B 7/465; H04B 7/0469; H04B 7/0473; H04B 7/0482; H04B 7/0486; H04B 7/0717; H04B 7/0619; H04B 7/063
See application file for complete search history.

(56) References Cited

U.S. PATENT DOCUMENTS

2017/0294943 A1*  10/2017  Shen ..................... H04B 7/06
2018/0097595 A1*  4/2018  Huang ................ H04B 7/0413

OTHER PUBLICATIONS

"Draft Report of 3GPP TSG RAN WG1 #88 v0.1.0", 3GPP TSG-RAN Working Group 1 meeting #88bis, R1-17xxxxx, MCC Support, Apr. 3-7, 2017, pp. 1-145.
"Non-Codebook Based UL-MIMO Transmission", 3GPP TSG-RAN Working Group 1 meeting #88bis, R1-1705980, Agenda: 8.1.2.6, Nokia, Apr. 3-7, 2017, 4 pages.
(Continued)

*Primary Examiner* — Kevin Kim
(74) *Attorney, Agent, or Firm* — Squire Patton Boggs (US) LLP

(57) ABSTRACT

Systems, methods, apparatuses, and computer program products relating to support MIMO on the UL with flexibility and enhanced performance, for example, in 5G or new radio access technology (NR).

16 Claims, 9 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211, V10.7.0, Feb. 2013, pp. 1-101.

"Final Report of 3GPP TSG RAN WG1 #88bis v1.0.0", 3GPP TSG RAN WG1 Meeting #89, R1-1708890, MCC Support, May 15-19, 2017, pp. 1-154.

"Final Report of 3GPP TSG RAN WG1 #AH1_NR v1.0.0", 3GPP TSG RAN WG1 Meeting #88, R1-1701553, MCC Support, Feb. 13-17, 2017, pp. 1-106.

* cited by examiner

APERTURE CONSTRAINT FOR NEW RADIO UPLINK MULTIPLE-INPUT MULTIPLE-OUTPUT

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to NR support for multiple-input, multiple-output (MIMO) on the uplink (UL).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the node B or eNB may be referred to as a next generation node B (gNB).

Multi-antenna technology is also an important component of 5G NR. Like LTE, NR will support multiple-input, multiple output (MIMO) on both the downlink (DL) and the uplink (UL). One issue for NR MIMO will be the codebook design to support a large number of antenna elements.

SUMMARY

In a first aspect thereof the exemplary embodiments of this invention provide a method that comprises receiving or calculating aperture constraint parameters, and applying the aperture constraint parameters to limit uplink precoder candidates for transmission.

In a further aspect thereof the exemplary embodiments of this invention provide an apparatus that comprises at least one data processor and at least one memory that includes computer program code. The at least one memory and computer program code are configured, with the at least one data processor, to cause the apparatus, at least to receive or calculate aperture constraint parameters, and apply the aperture constraint parameters to limit uplink precoder candidates for transmission.

In another aspect thereof the exemplary embodiments of this invention provide an apparatus that comprises at least one data processor and at least one memory that includes computer program code. The at least one memory and computer program code are configured, with the at least one data processor, to cause the apparatus, at least to configure aperture constraint parameters, and indicate the aperture constraint parameters to at least one user equipment wherein the aperture constraint parameters cause the at least one user equipment to limit uplink precoder candidates for transmission.

BRIEF DESCRIPTION OF THE DRAWINGS

For proper understanding of the invention, reference should be made to the accompanying drawings, wherein.

DETAILED DESCRIPTION

Figure 1:
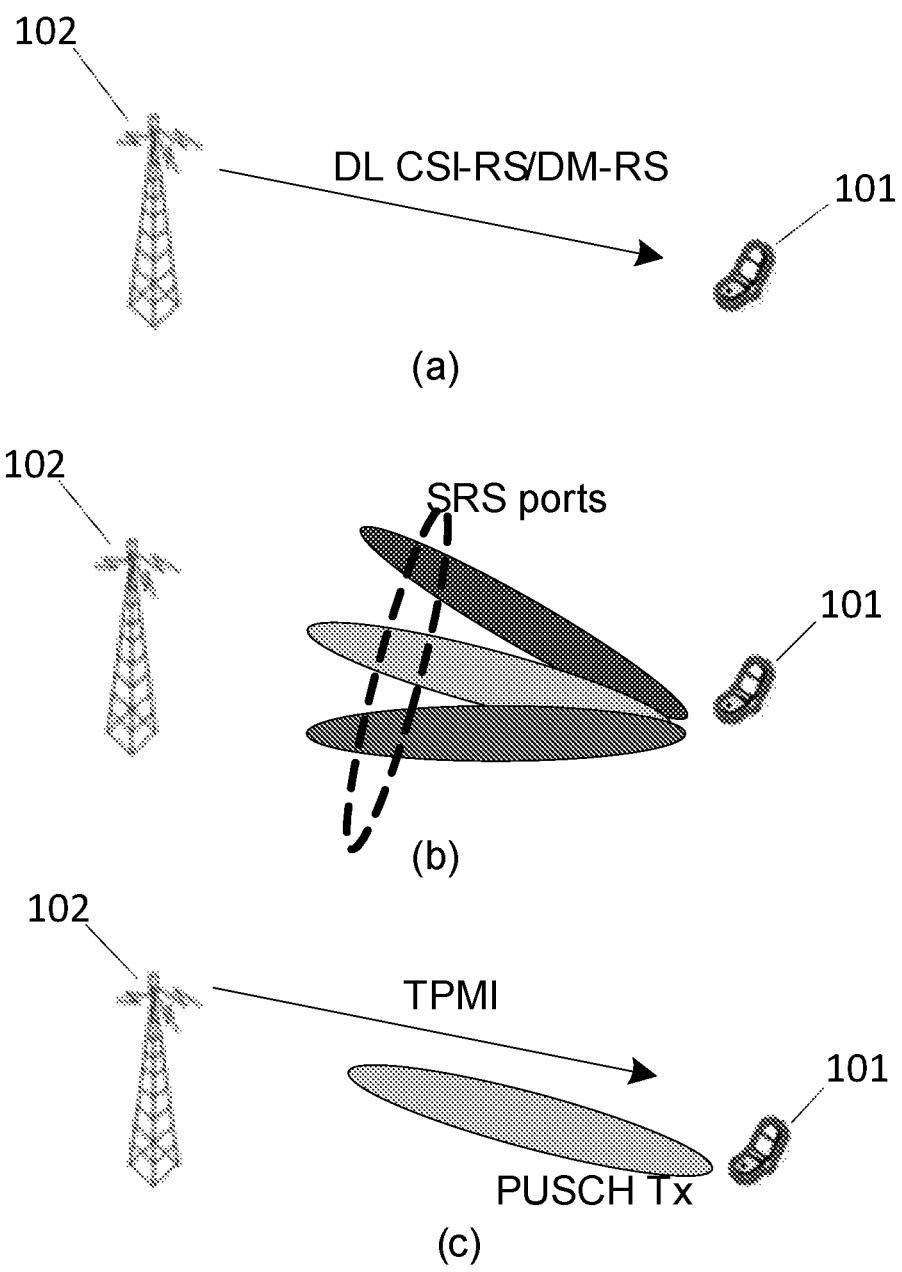
FIG. 1 illustrates an example approach for non-codebook based UL-MIMO with beamformed SRS.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to support MIMO on the UL with flexibility and enhanced performance, for example, in 5G or new radio access technology (NR), as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As will be described in the following, embodiments are able to support large number of antenna elements with flexibility and enhanced performance. One embodiment relates to support of MIMO on the UL for NR, e.g., on UL MIMO.

Multi-antenna transmission through precoding has evolved and been enhanced over several releases for LTE, and only the more recent releases have support for precoded UL transmission. NR presents the opportunity to design a MIMO codebook for UL considering the enhanced capabilities of NR technology. One consideration for MIMO codebook design, however, is the trade-off between high resolution and feedback cost. Thus, while better performance can be achieved with codebooks with a higher resolution, the approach should be carefully balanced with the associated extra cost in terms of feedback overhead.

One possible UL precoding is based on non-beamformed sounding reference signal (SRS) transmission. The UE may first transmit the omni-directional SRS to a gNB. The gNB may estimate the UE specific codebook based on its SRS reception. The UE specific codebook indicator TPMI will be signaled to the UE for uplink transmission. Usually, the UE codebook will cover the full spatial domain.

Another possible UL precoding, based on beamformed SRS transmission, is to support reciprocity based transmission with partial reciprocity at the UE side. FIG. 1 illustrates an example of this approach for non-codebook based UL-MIMO with beamformed SRS. As depicted in FIG. 1(a), the UE 101 may detect DL channel information based on DL channel state information-reference signal (CSI-RS) or demodulation-reference signal (DM-RS). As depicted in FIG. 1(b), based on channel reciprocity and measured DL channel, the UE 101 may select its SRS precoders for multiple beamformed SRS transmission. The SRS resources/ports can be determined by the transmit (Tx)/receive (Rx) reciprocity property. If the reciprocity is "ideal", the choice of SRS resources is limited. If the UE 101 has no reciprocity capability, it can still select multiple SRS resources to enable gNB 102 to indicate its Tx precoder. As illustrated in FIG. 1(c), gNB 102 may detect the UE specific beamformed SRS and signals one TPMI or multiple TPMIs in the downlink control information (DCI) to the UE 101, and the UE 101 may select its PUSCH precoder based on the TPMI(s) indication from gNB 102.

One problem demonstrated in FIG. 1 is that the SRS transmission/feedback overhead will be significant if the DL/UL reciprocity is non-ideal. A possible application of certain embodiments may allow the UE to pick its PUSCH or SRS precoders for multiple SRS transmissions.

For the NR uplink, a two-stage MIMO codebook design may be adopted. Assuming a precoder W of size P×v with P antenna ports and rank v, the output signal at the antenna ports can be represented as a P×1 vector y, as: y=Wx, where x is a rank-v data symbol vector with size of v×1.

With a two-stage codebook design, the precoder W has the form of $W=W_1 W_2$, where $W_1$ contains the wideband component of the precoder and $W_2$ contains the sub-band specific components of the precoder.

In a two-stage codebook, $W_1$ may have the form:

$$W_1 = \begin{bmatrix} B & 0 \\ 0 & B \end{bmatrix}.$$

Figure 8:
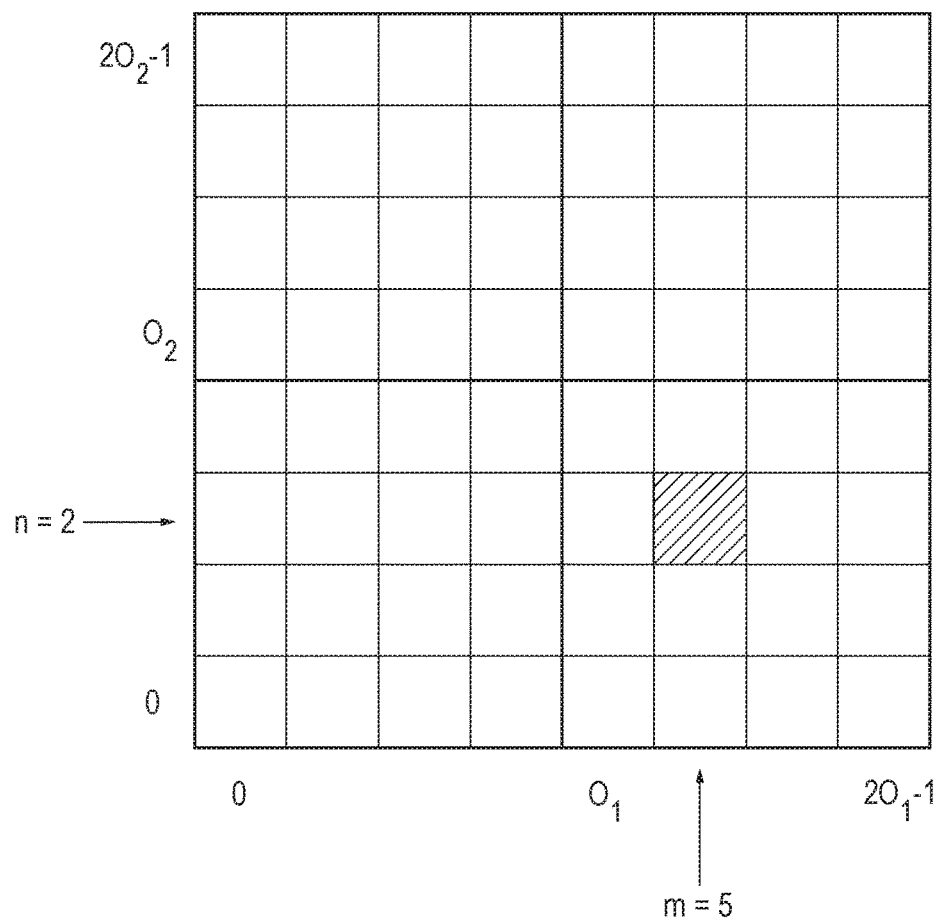
FIG. 8 illustrates an oversampled two-dimensional DFT grid.

The sub-precoder matrix B within $W_1$ includes L columns corresponding to a set of L DFT beams: $B=[b_{m_0,n_0}, \ldots, b_{m_{L-1},n_{L-1}}]$. The upper left value of B within $W_1$ applies to a first polarization and the lower right value of B within $W_1$ applies to a second polarization. For a two-dimensional (2D) antenna port layout, the L DFT beams are 2D DFT beams chosen from an oversampled 2D DFT grid. FIG. 8 illustrates an example of an oversampled 2D DFT grid with $N_1=2$ azimuth antennas and $N_2=2$ elevation antennas per polarization with oversampling factors of $O_2=4$ in elevation. A location in the grid represents a 2D DFT beam. For example, the location with azimuth index m=5 and elevation index n=2 represents the beam, $$b_{m,n} = u_m \otimes v_n$$

$$u_m = [1 e^{j2\pi m/O_1 N_1} \ldots e^{j2\pi m(N_1-1)/O_1 N_1}]^T$$

$$v_n = [1 e^{j2\pi n/O_2 N_2} \ldots e^{j2\pi n(N_2-1)/O_2 N_2}]^T$$

where $\otimes$ represents the Kronecker product. The index m indicates a beam pointing in a horizontal direction $\theta_H$. The index n indicates a beam pointing in a vertical direction $\theta_V$. Together, the m and n indices indicate a three-dimensional direction ($\theta_H$, $\theta_V$). The angles increase as m and n increase so a 2D region of the oversampled grid spans a range of angles in azimuth and elevation.

Figure 2:
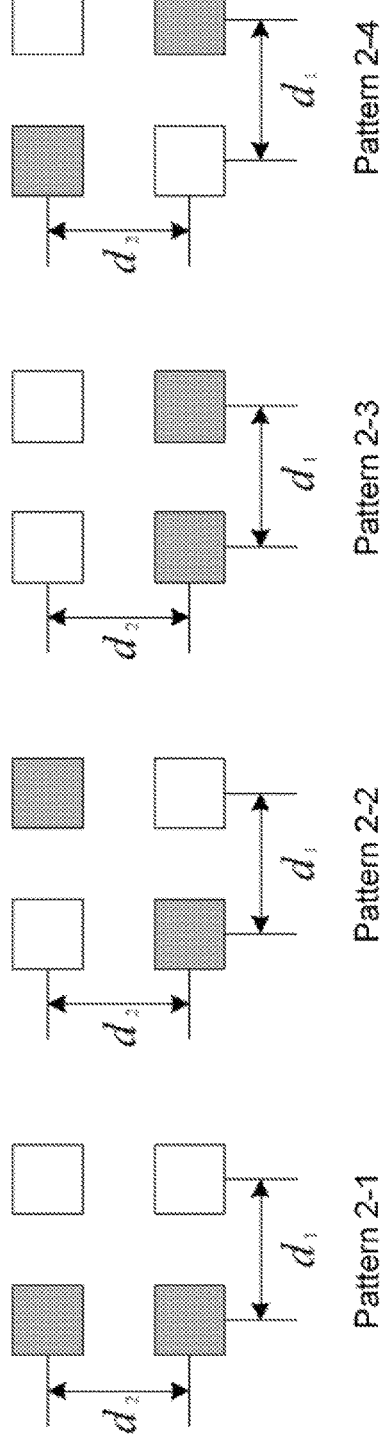
FIG. 2 illustrates an example of the beam patterns for L=2.
Figure 3:
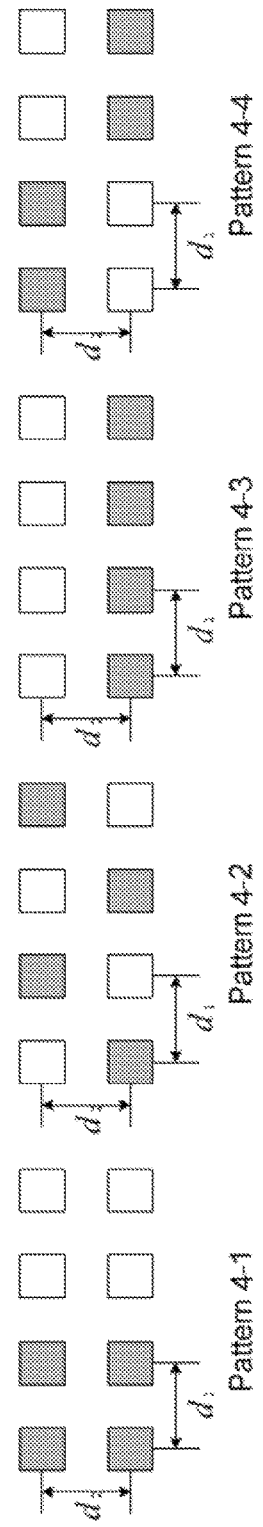
FIG. 3 illustrates an example of the beam patterns for L=4.

When L>1, the beams in the sub-precoder matrix B may be determined using a beam pattern in the 2D DFT grid. FIG. 2 illustrates examples of possible beam patterns for L=2. FIG. 3 illustrates examples of possible beam patterns for L=4. The beams in a beam pattern are separated by multiples of the horizontal (azimuth) distance $d_1$ and the vertical (elevation) distance $d_2$. When L=1, the beam pattern consists of individual grid locations.

The beam patterns are placed within the oversampled DFT grid by the location of their lower left corner, known as the anchor location and the corresponding beam is known as the anchor beam. It is possible that only some DFT grid locations are allowed as anchor locations. The allowed locations may be determined by grid sub-sampling in both azimuth and elevation directions using the sampling factors ($g_1$, $g_2$). For example, a value of $g_1=2$ indicates that every other grid location is an allowed anchor location in the azimuth direction within the oversampled DFT grid.

The available choices for the $W_1$ matrix are determined by the antenna configuration ($N_1$, $N_2$), the DFT oversampling ($O_1$, $O_2$), the number of beams L, the beam pattern, the beam distances ($d_1$, $d_2$), and the grid sampling factors ($g_1$, $g_2$). These parameters may be configured by the gNB or may be fixed by the choice of codebook. Other methods for setting these parameters may also be possible. Collectively, these parameters determine the possible $W_1$ matrices, where each matrix is identified by the corresponding anchor beam.

According to certain embodiments, a UL transmission aperture constraint may be provided and/or applied in order to limit UL precoder candidates for transmission and feedback overhead reduction. In some embodiments, the aperture constraint on $W_1$ beams may be provided under two approaches. In one approach, the UE can restrict the anchor beam selections from all available anchor beams, thereby restricting the $W_1$ candidates. In another approach, the UE can improve $W_1$ beam resolution by increasing the oversampling size within the aperture constraint.

The UL aperture constraint, according to some embodiments, may refer to limiting the $W_1$ anchor beams to a set whose elements are confined or constrained to a specific angular region on the assumption that anchor beams outside of that angular region are rarely if ever usable by the UE.

A UE usually has its downlink information before its uplink transmission. The acquisition of downlink channel state information (CSI) including downlink beams can be based on the UE's measurement of the synchronization channel, CSI-RS, or downlink DM-RS. The downlink CSI beam information may be used to constrain the set of anchor beams available to the specific UE.

According to an embodiment, the aperture constraint may be applied for the UE data channel, PUSCH. The UE may use downlink CSI to pick the aperture constraint parameters for $W_1$; alternatively, some aperture constraint parameters may be indicated by the gNB. The constraint may limit the candidates for $W_1$ for uplink data channel transmission.

In certain embodiments, the aperture constraint may be applied to PUSCH or a beamformed SRS channel as well.

Figure 4:
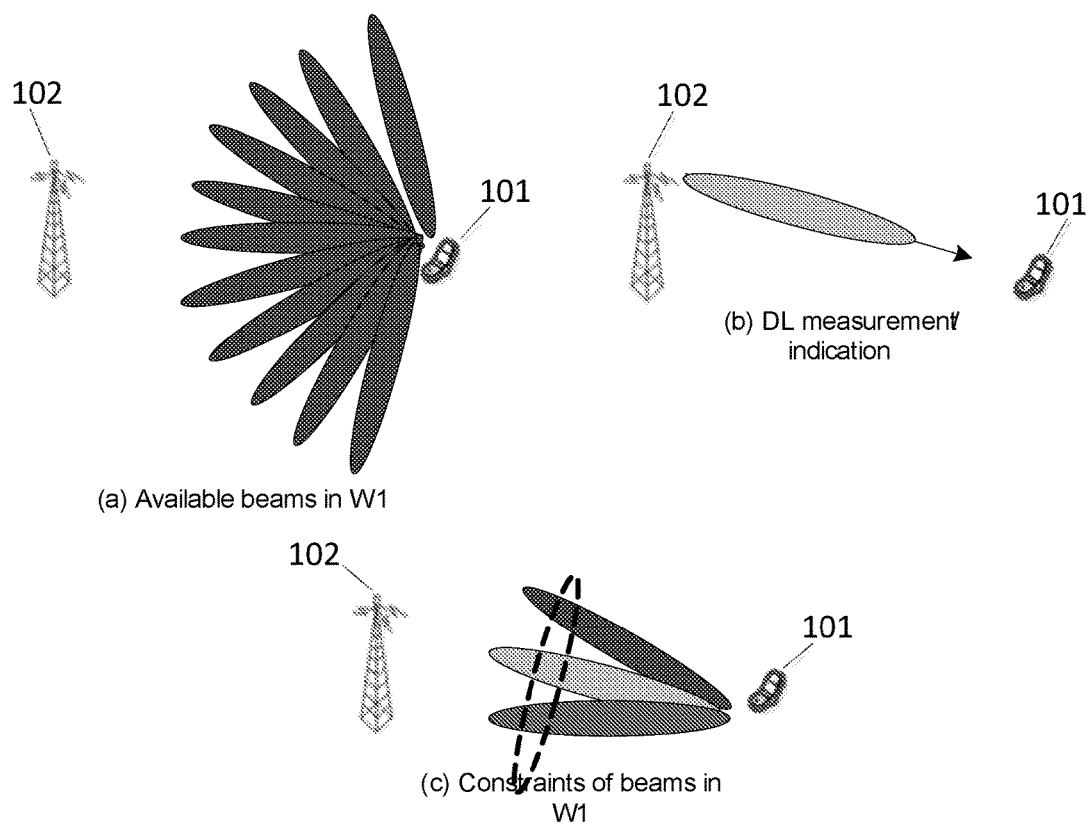
FIG. 4 illustrates an example approach for aperture constraint in $W_1$ selection.

FIG. 4 illustrates an example approach for an aperture constraint in $W_1$ selection (applicable to PUSCH or beamformed SRS). FIG. 4(a) illustrates potential anchor beams specified in $W_1$ of the general codebook, which is defined over the full space. Conventional approaches in LTE and NR will feedback one anchor beam (one $W_1$) to the UE among the available anchor beams in the full space. The $W_1$ feedback overhead may depend on the number of available anchor beams in $W_1$, as designed to cover the whole space.

FIG. 4(b) illustrates DL measurement/indication, as one approach for the UE to acquire DL CSI. The UE may use this information to reduce the number of available $W_1$ selections by restricting the anchor beam choices. Such $W_1$ constraint and associated $W_1$ anchor beam constraint information may be either configured by the gNB, or indicated by the UE. The resulting codebook in $W_1$ may either have fewer anchor beams, as illustrated in FIG. 4(c), which reduces feedback overhead, or have better resolution beams, which improves beamforming performance. As described herein, codebook aperture, or aperture, refers to the combination of all allowed anchor beams in $W_1$. FIG. 4(c) depicts the approach of aperture constraints through configuration or indication of $W_1$ and its associated beams.

Figure 5:
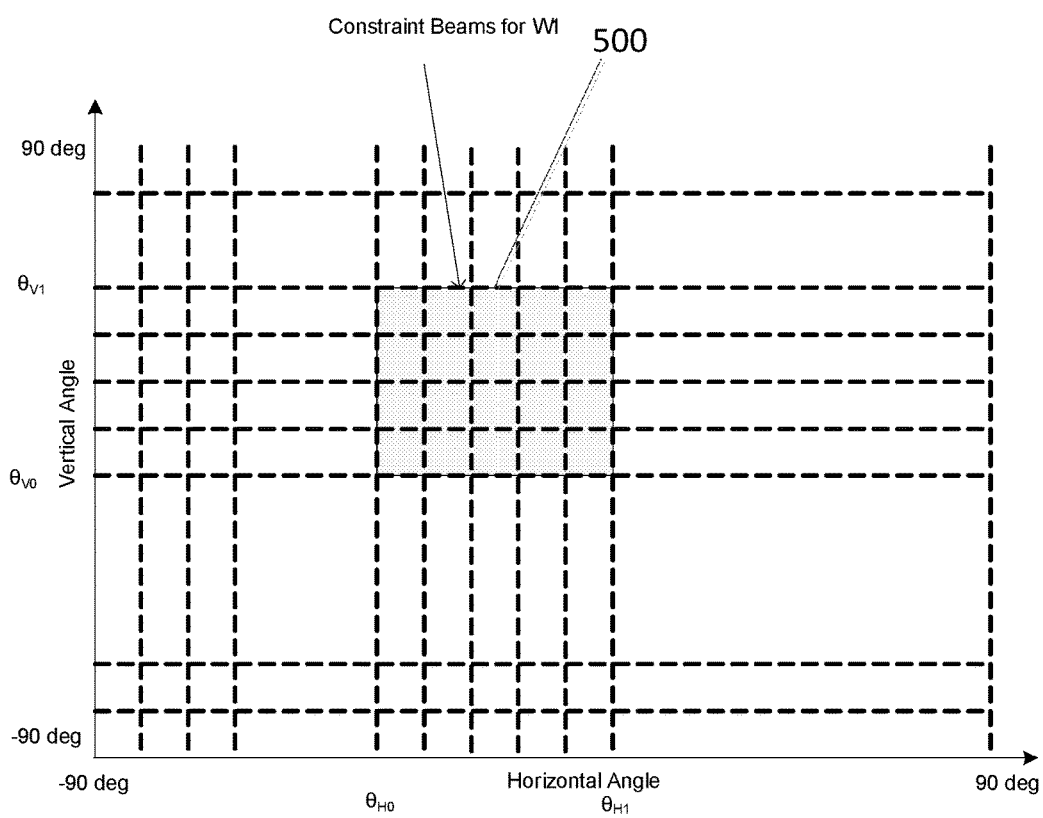
FIG. 5 illustrates an example of the application of aperture constraint on $W_1$ beams.

FIG. 5 illustrates an example of the application of an aperture constraint on $W_1$ anchor beams. FIG. 5 depicts an example for the aperture constraint for uplink codebook design. There may be 4 input parameters, ($\theta_{H0}$, $\theta_{H1}$, $\theta_{V0}$, $\theta_{V1}$), which constrain the UL aperture size. The angles ($\theta_{H0}$, $\theta_{H1}$) indicate the aperture constraint in horizontal antenna direction (where 2-D antenna elements are assumed for UE), and the angles ($\theta_{V0}$, $\theta_{V1}$) indicate the aperture constraint in the vertical antenna direction. The uplink anchor beams may be limited to the shaded region 500. The angular constraint corresponds to limits on the allowed ranges of the m and n indices in FIG. 8. Another method for specifying the aperture constraint is to provide a set of allowed combinations of horizontal and vertical angles ($\theta_H$, $\theta_V$) or, equivalently, an allowed set of (m, n) combinations.

Figure 9:
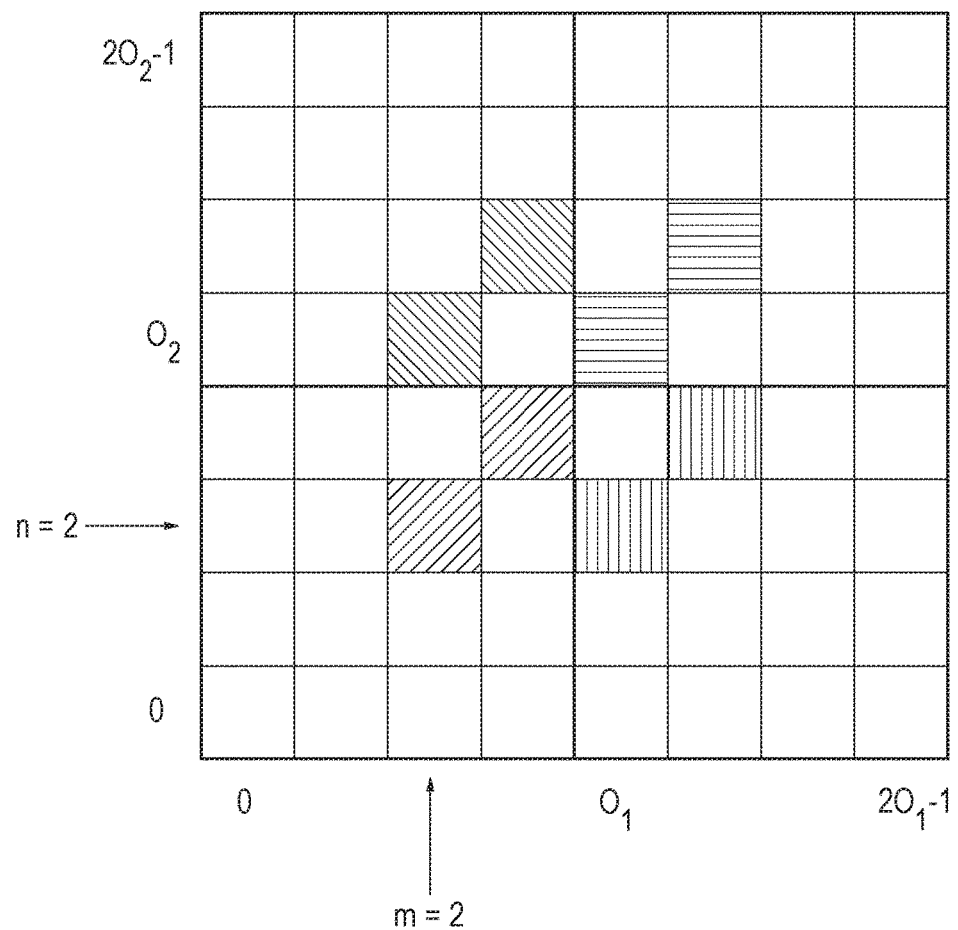
FIG. 9 illustrates a first example of a codebook with an aperture constraint.
Figure 10:
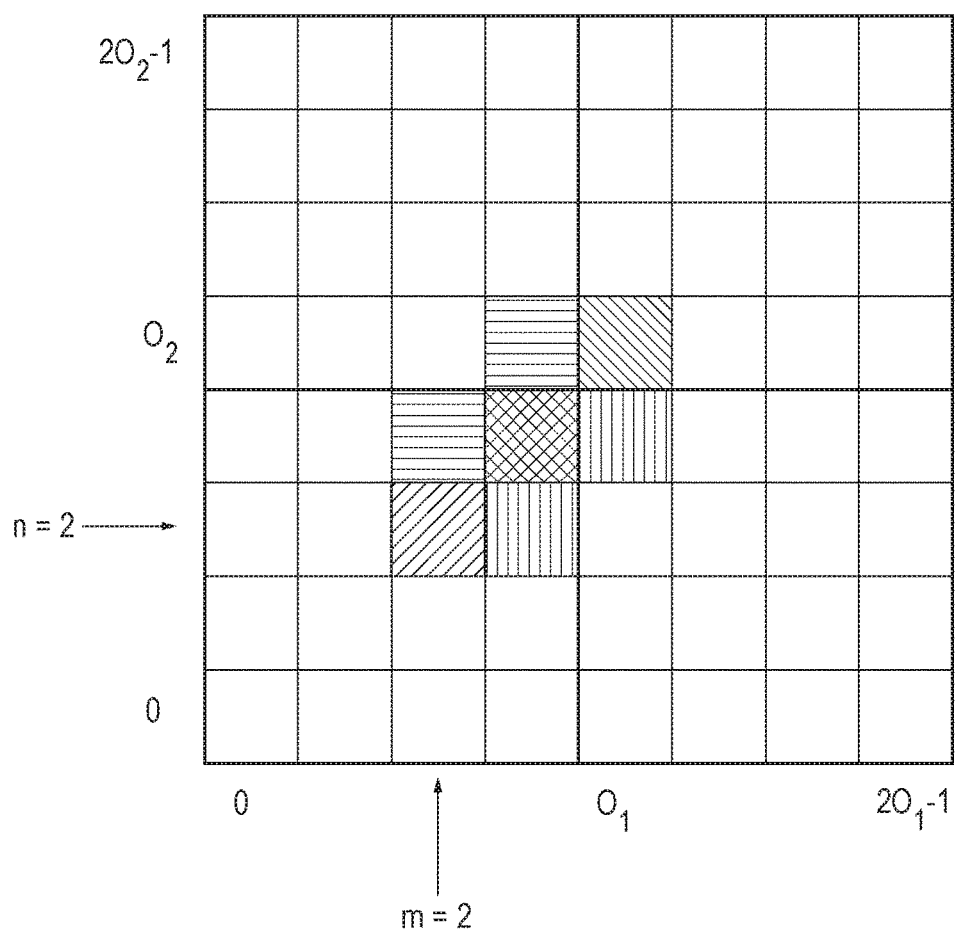
FIG. 10 illustrates a second example of a codebook with an aperture constraint.

FIG. 9 illustrates the effect of an aperture constraint showing all beams in $W_1$. In the example, $N_1=N_2=2$, $O_1=O_2=4$, L=2, beam pattern 2-2 is used, $d_1=d_2=1$, and $g_1=g_2=2$. The aperture constraint has limited (m, n) to (m, n)∈{(2,2), (2,4), (4,2), (4,4)}. Another example is shown in FIG. 10, where $N_1=N_2=2$, $O_1=O_2=4$, L=2, beam pattern 2-2 is used, $d_1=d_2=1$, and $g_1=g_2=1$. The aperture constraint in FIG. 10 has limited (m, n) to (m, n)∈{(2,2), (2,3), (3,2), (3,3)}, where the choices for $W_1$ span a smaller angular aperture than in the example of FIG. 9.

In an embodiment, calculation of the aperture constraint region ($\theta_{H0}$, $\theta_{H1}$, $\theta_{V0}$, $\theta_{V1}$) may be based on the UE's estimation of DL CSI, gNB indication, or both. The UE may choose a relatively wide or narrow constraint region to ensure trade-off between performance and reliability.

There may be at least two approaches for the beam limitation of $W_1$. The first approach is the limitation of $W_1$'s anchor beam candidates. The selectable beams of $W_1$ may be determined by the allowed anchor beams as given by the allowed combinations of the (m, n) indices.

With the aperture constraint of ($\theta_{H0}$, $\theta_{H1}$, $\theta_{V0}$, $\theta_{V1}$), the number of $W_1$ anchor beams will be reduced. In an embodiment, the anchor beams within the constraint area will be allowed for $W_1$ construction. For precoded PUSCH transmission, the feedback overhead for $W_1$ is reduced because of reduced number of $W_1$ candidates. For non-beamformed SRS transmission, the feedback overhead is reduced due to fewer $W_1$ choices, when the constraint information is available for both the gNB and the UE. For beamformed SRS transmission, as indicated in FIG. 1, the number of beamformed SRS transmissions may be reduced. A significant saving of SRS transmission overhead may be achieved with this approach. The feedback overhead may also be reduced due to fewer $W_1$ choices.

In another embodiment, a second approach is to use the aperture constraint to form higher resolution beams for better performance. For example, with the aperture constraint ($\theta_{H0}$, $\theta_{H1}$, $\theta_{V0}$, $\theta_{V1}$), alternative oversampling factors ($O_1$, $O_2$) may be selected to generate anchor beams with better spatial resolution within the constraint region. If applied over the entire angular space, the alternative sampling factors would yield a larger set of allowed (m, n) combinations, but the aperture constraint limits the values to lie within the constraint region, where there are more overlapping beams than with the original oversampling factors. Performance gain is expected with a higher resolution codebook in uplink.

According to certain embodiments, both the first approach and the second approach may be applied together to achieve overhead reduction and better spatial resolution precoding.

Figure 6A:
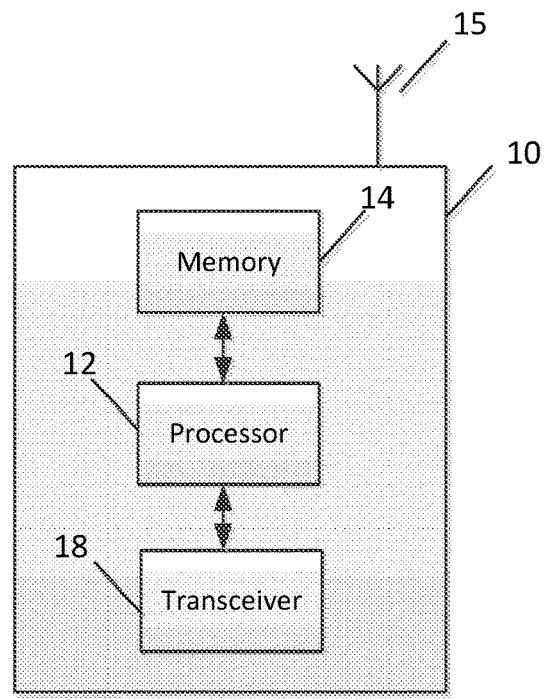
FIG. 6a illustrates an example block diagram of an apparatus according to an embodiment.

FIG. 6a illustrates an example of an apparatus 10 according to an embodiment. In an embodiment, apparatus 10 may be a node, host, or server in a communications network or serving such a network. For example, in some embodiments, apparatus 10 may be a base station, a node B, an evolved node B, 5G node B or access point, next generation node B (NG-NB or gNB), WLAN access point, mobility management entity (MME), or subscription server associated with a radio access network, such as a GSM network, LTE network, 5G or NR. In an embodiment, as will be discussed below, apparatus 10 may be a network node for 5G or NR, such as a gNB.

It should be understood that apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 6a.

As illustrated in FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, as mentioned above, apparatus 10 may be a network node, such as a gNB or eNB. According to certain embodiments, apparatus 10 may be controlled by memory 14 and processor 12 to perform the functions associated with any of the embodiments described herein. In an embodiment, apparatus 10 may be controlled by memory 14 and processor 12 to signal or indicate aperture constraint parameters to at least one UE. The aperture constraint parameters may then be used by the UE to limit UL precoder candidates for transmission and feedback overhead reduction. For example, the aperture constraint parameters may be used to limit the beams in $W_1$ to a set whose elements are confined or constrained to a specific angular region because anchor beams outside of that angular region are rarely if ever usable by the UE.

According to one embodiment, apparatus 10 may be controlled by memory 14 and processor 12 to indicate the aperture constraint parameters by transmitting a DL measurement/indication, as one approach for UE(s) to acquire DL CSI. The UE(s) may use this information to constrain its $W_1$ selection and beam selection in $W_1$.

In an embodiment, apparatus 10 may be controlled by memory 14 and processor 12 to configure the aperture constraint and associated $W_1$ anchor beam constraint information. The resulting codebook in $W_1$ will either have fewer anchor beams thereby reducing feedback overhead, or have better resolution beams thereby improving beamforming performance.

According to some embodiments, there may be four input parameters, ($\theta_{H0}$, $\theta_{H1}$, $\theta_{V0}$, $\theta_{V1}$), which constrain the UL aperture size. The angles ($\theta_{H0}$, $\theta_{H1}$) may indicate the aperture constraint in the horizontal antenna direction (where 2-D antenna elements are assumed for a UE), and the angles ($\theta_{V0}$, $\theta_{V1}$) may indicate the aperture constraint in the vertical antenna direction. In one embodiment, apparatus 10 may be controlled by memory 14 and processor 12 to calculate the aperture constraint region ($\theta_{H0}$, $\theta_{H1}$, $\theta_{V1}$, $\theta_{V1}$), and to indicate the aperture constraint parameters, as discussed above.

Figure 6B:
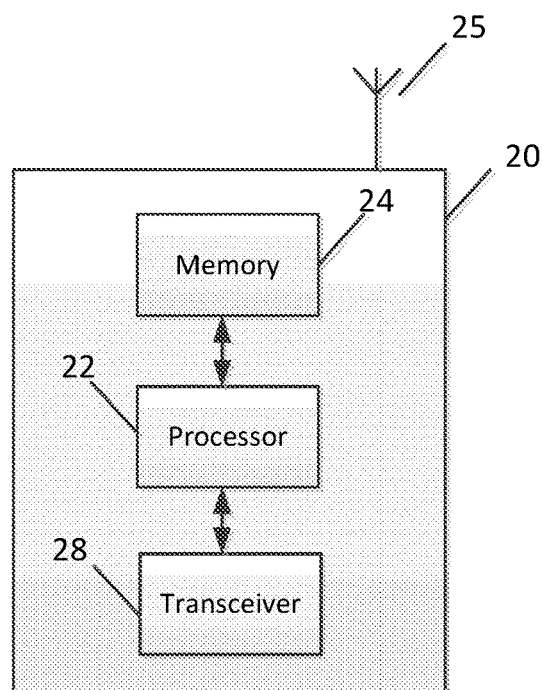
FIG. 6b illustrates an example block diagram of an apparatus according to another embodiment.

FIG. 6b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, and any other radio access technologies. It should be noted that one of ordinary skill in the art would understand that apparatus 20 may include components or features not shown in FIG. 6b.

As illustrated in FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein.

According to certain embodiments, apparatus 20 may be controlled by memory 24 and processor 22 to apply an aperture constraint to limit UL precoder candidates for transmission. The aperture constraint may limit anchor beams in $W_1$ to a set whose elements are constrained to a specific angular region since anchor beams outside of that angular region are rarely usable by the UE. In some embodiments, apparatus 20 may be controlled by memory 24 and processor 22 to receive the aperture constraint from a network node, such as a gNB. For example, the aperture constraint may be received from a gNB in a DL measurement/indication. In other embodiments, apparatus 20 may be controlled by memory 24 and processor 22 to calculate the aperture constraint. For example, in some embodiments, apparatus 20 may be controlled by memory 24 and processor 22 to calculate or select the aperture constraint using DL CSI.

In certain embodiments, apparatus 20 may be controlled by memory 24 and processor 22 to apply the aperture constraint by restricting the anchor beam selections from all available transmit beams in $W_1$ selection. In other embodiments, apparatus 20 may be controlled by memory 24 and processor 22 to apply the aperture constraint by increasing the oversampling size within the aperture constraint region to improve $W_1$ beam resolution.

According to some embodiments, apparatus 20 may be controlled by memory 24 and processor 22 to apply the aperture constraint for a data channel of the UE, such as a physical uplink shared channel (PUSCH). In another embodiment, apparatus 20 may be controlled by memory 24 and processor 22 to apply the aperture constraint to beamformed SRS channel.

In an embodiment, there may be four input parameters, $(\theta_{H0}, \theta_{H1}, \theta_{V0}, \theta_{V1})$, which constrain the UL aperture size. The angles $(\theta_{H0}, \theta_{H1})$ may indicate the aperture constraint in the horizontal antenna direction, and the angles $(\theta_{V0}, \theta_{V1})$ may indicate the aperture constraint in the vertical antenna direction. The uplink anchor beams may then be limited to this region.

According to one embodiment, apparatus 20 may be controlled by memory 24 and processor 22 to calculate the aperture constraint region $(\theta_{H0}, \theta_{H1}, \theta_{V0}, \theta_{V1})$ based on apparatus 20 estimation on DL, gNB indication, or both. In an embodiment, apparatus 20 may then be controlled by memory 24 and processor 22 to select or pick a relatively wide or narrow constraint region to ensure trade-off between performance and reliability.

According to certain embodiments, there may be at least two approaches for the beam limitation of $W_1$. The first approach is the limitation of $W_1$'s anchor beam candidates. In an embodiment according to this first approach, apparatus 20 may be controlled by memory 24 and processor 22 to determine selectable beams of $W_1$ by the allowed anchor beams as given by the allowed combinations of the (m, n) indices.

With the aperture constraint of $(\theta_{H0}, \theta_{H1}, \theta_{V0}, \theta_{V1})$, the number of $W_1$ anchor beams will be reduced. Only the anchor beams within the constraint area will be allowed for $W_1$ construction. For non-beamformed SRS transmission, the feedback overhead is reduced due to the fewer $W_1$ choices, when the constraint information is available for both gNB and apparatus 20. For beamformed SRS transmission, the number of beamformed SRS transmissions can be reduced. A significant saving of SRS transmission overhead is achieved with this approach. The feedback overhead is also reduced due to fewer $W_1$ choices.

According to another embodiment, a second approach may be to use the aperture constraint to form higher resolution beams for better performance. For example, with the aperture constraint $(\theta_{H0}, \theta_{H1}, \theta_{V0}, \theta_{V1})$, apparatus 20 may be controlled by memory 24 and processor 22 to select alternative oversampling factors $(O_1, O_2)$ to generate anchor beams with better spatial resolution within the constraint region. If applied over the entire angular space, the alternative sampling factors would yield a larger set of allowed (m, n) combinations, but the aperture constraint limits the values to lie within the constraint region, where there are more overlapping beams than with the original oversampling factors. Performance gain is expected with a higher resolution codebook in uplink.

It is noted that, according to some embodiments, apparatus 20 may be configured to apply both the first approach and the second approach together to achieve overhead reduction and better spatial resolution precoding.

Figure 7A:
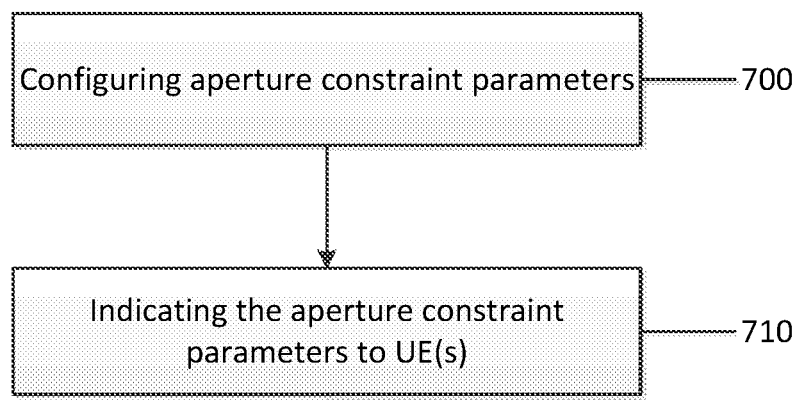
FIG. 7a illustrates an example flow chart of a method, according to an embodiment.

FIG. 7a illustrates an example flow diagram of a method, according to one embodiment. The method of FIG. 7a may be performed, for example, by a network node, such as a base station, access point, eNB, gNB, or the like. As illustrated in FIG. 7a, the method may include, at 700, configuring aperture constraint parameters and/or associated $W_1$ beam constraint information. The resulting codebook in $W_1$ will either have fewer anchor beams thereby reducing feedback overhead, or have better resolution beams thereby improving beamforming performance. In an embodiment, the method may include, at 710, signaling or indicating the aperture constraint parameters to at least one UE. The aperture constraint parameters may then be used by the UE to limit UL precoder candidates for transmission and feedback overhead reduction. For example, the aperture constraint parameters may be used to limit the anchor beams in $W_1$ to a set whose elements are confined or constrained to a specific angular region because anchor beams outside of that angular region are rarely if ever usable by the UE.

According to one embodiment, the signaling of the aperture constraint parameters may include indicating the aperture constraint parameters by transmitting a DL measurement/indication, as one approach for UE(s) to acquire DL CSI. The UE(s) may use this information to constrain its $W_1$ selection and beam selection in $W_1$.

In an embodiment, there may be four input parameters, $(\theta_{H0}, \theta_{H1}, \theta_{V0}, \theta_{V1})$, which constrain the UL aperture size. The angles $(\theta_{H0}, \theta_{H1})$ may indicate the aperture constraint in the horizontal antenna direction (where 2-D antenna elements are assumed for a UE), and the angles $(\theta_{V0}, \theta_{V1})$ may indicate the aperture constraint in the vertical antenna direction. In one embodiment, the configuring of the aperture constraint parameters may include calculating the aperture constraint region $(\theta_{H0}, \theta_{H1}, \theta_{V0}, \theta_{V1})$, and then indicating the aperture constraint parameters, at 710, as discussed above.

Figure 7B:
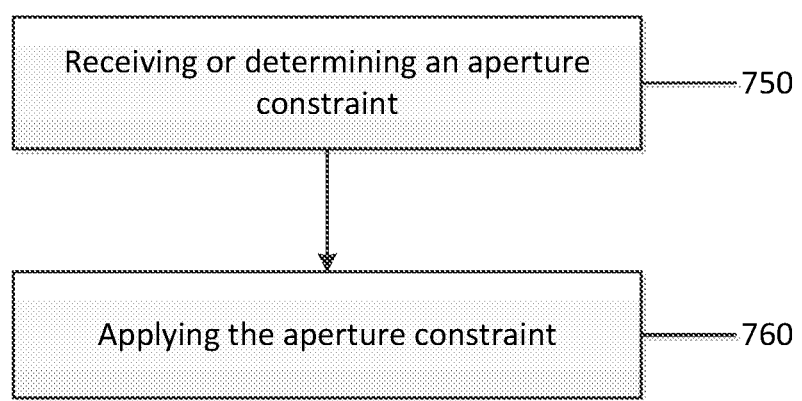
FIG. 7b illustrates an example flow chart of a method, according to another embodiment.

FIG. 7b illustrates an example flow diagram of a method, according to one embodiment. The method of FIG. 7b may be performed, for example, by a UE, mobile station, mobile device, IoT device, MTC device, or the like. As illustrated in FIG. 7b the method may include, at 750, receiving or determining an aperture constraint to limit UL precoder candidates for transmission. In some embodiments, the aperture constraint may be received from a network node, such as a gNB. For example, the aperture constraint may be received from a gNB in a DL measurement/indication. In other embodiments, the aperture constraint may be determined by the UE. For example, in some embodiments, the method may include calculating or selecting the aperture constraint using DL CSI.

In an embodiment, the method may further include, at 760, applying the aperture constraint to limit anchor beams in $W_1$ to a set whose elements are constrained to a specific angular region since anchor beams outside of that angular region are rarely usable by the UE.

In certain embodiments, the applying of the aperture constraint may include restricting the anchor beam selections from all available transmit beams in $W_1$ selection. In other embodiments, the applying of the aperture constraint may include increasing the oversampling size within the aperture constraint region to improve $W_1$ beam resolution.

According to some embodiments, the applying of the aperture constraint may be for a data channel of the UE, such as a physical uplink shared channel (PUSCH). In another embodiment, the applying of the aperture constraint may be to a beamformed SRS channel.

According to one embodiment, the method may include calculating the aperture constraint region based on the UE's estimation on DL, gNB indication, or both. In an embodiment, the method may include selecting or picking a relatively wide or narrow constraint region to ensure trade-off between performance and reliability.

According to certain embodiments, there may be at least two approaches for the beam limitation of $W_1$. The first approach is the limitation of $W_1$'s anchor beam candidates. In an embodiment according to this first approach, the method may include determining selectable beams of $W_1$ by the allowed anchor beams as given by the allowed combinations of the (m, n) indices.

According to another embodiment, a second approach may be to use the aperture constraint to form higher resolution beams for better performance. For example, with the aperture constraint $(\theta_{H0}, \theta_{H1}, \theta_{V0}, \theta_{V1})$, the method may include selecting alternative oversampling factors $(O_1, O_2)$ to generate anchor beams with better spatial resolution within the constraint region. If applied over the entire angular space, the alternative sampling factors would yield a larger set of allowed (m, n) combinations, but the aperture constraint limits the values to lie within the constraint region, where there are more overlapping beams than with the original oversampling factors.

In view of the above, embodiments of the invention provide several technical effects and/or improvements and/or advantages. For example, certain embodiments can achieve overhead reduction and improved spatial resolution precoding. As a result, certain embodiments can improve performance and throughput of network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One embodiment is directed to a method that may include a network node indicating aperture constraint parameters to at least one UE. In an embodiment, the aperture constraint parameters may be indicated in a DL measurement/indication. The aperture constraint parameters may be used by the at least one UE to limit UL precoder candidates for transmission.

Another embodiment is directed to an apparatus that may include at least one processor and at least one memory including computer program code. The at least one memory and the computer program code are configured, with the at least one processor, to cause the apparatus at least to indicate aperture constraint parameters to at least one UE. In an embodiment, the aperture constraint parameters may be indicated in a DL measurement/indication. The aperture constraint parameters may be used by the at least one UE to limit UL precoder candidates for transmission.

Another embodiment is directed to an apparatus that may include transmitting means for indicating aperture constraint parameters to at least one UE. In an embodiment, the transmitting means may include means for indicating the aperture constraint parameters in a DL measurement/indication. The aperture constraint parameters may be used by the at least one UE to limit UL precoder candidates for transmission.

Another embodiment is directed to a computer program embodied on a non-transitory computer readable medium. The computer program may include computer code configured to control a processor to perform a process that may include indicating aperture constraint parameters to at least one UE. In an embodiment, the aperture constraint parameters may be indicated in a DL measurement/indication. The aperture constraint parameters may be used by the at least one UE to limit UL precoder candidates for transmission.

Another embodiment is directed to a method that may include applying, by a UE, an aperture constraint to limit UL precoder candidates for transmission. In one embodiment, the applying may include restricting the beam selections from all available transmit beams in uplink precoder or in uplink component precoder $W_1$ selection. In another embodiment, the applying may include increasing oversampling size within the aperture constraint to improve uplink precoder beam resolution or uplink component precoder $W_1$ beam resolution.

Another embodiment is directed to an apparatus that may include at least one processor and at least one memory including computer program code. The at least one memory and the computer program code are configured, with the at least one processor, to cause the apparatus at least to apply an aperture constraint to limit UL precoder candidates for transmission. In one embodiment, the applying may include restricting the beam selections from all available transmit beams in uplink precoder or in uplink component precoder $W_1$ selection. In another embodiment, the applying may include increasing oversampling size within the aperture constraint to improve uplink precoder beam resolution or uplink component precoder $W_1$ beam resolution.

Another embodiment is directed to an apparatus that may include applying means for applying an aperture constraint to limit UL precoder candidates for transmission. In one embodiment, the applying means may include means for restricting the beam selections from all available transmit beams in uplink precoder or in uplink component precoder $W_1$ selection. In another embodiment, the applying means may include means for increasing oversampling size within the aperture constraint to improve uplink precoder beam resolution or uplink component precoder $W_1$ beam resolution.

Another embodiment is directed to a computer program embodied on a non-transitory computer readable medium. The computer program may include computer code configured to control a processor to perform a process that may include applying an aperture constraint to limit UL precoder candidates for transmission. In one embodiment, the applying may include restricting the beam selections from all available transmit beams in uplink precoder or in uplink component precoder $W_1$ selection. In another embodiment, the applying may include increasing oversampling size within the aperture constraint to improve uplink precoder beam resolution or uplink component precoder $W_1$ beam resolution.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method comprising:
    receiving or calculating aperture constraint parameters, wherein the aperture constraint parameters are indicated by a network node in a downlink measurement indication; and
    applying the aperture constraint parameters to limit uplink precoder candidates for transmission.

2. The method as in claim 1, wherein the aperture constraint parameters are selected based on downlink channel state information.

3. The method as in claim 1, wherein the applying comprises restricting beam selections from all available transmit beams in uplink precoder or in uplink component precoder W1 selection.

4. The method as in claim 1, wherein the applying comprises increasing oversampling size within aperture constraint to improve uplink precoder beam resolution or uplink component precoder W1 beam resolution.

5. The method as in claim 1, wherein the aperture constraint parameters comprise at least one of parameters to constrain uplink aperture size, angles to constrain horizontal antenna direction, and angles to constrain vertical antenna direction.

6. The method as in claim 1, wherein the aperture constraint parameters are applied for a physical uplink shared channel of a user equipment or for a beamformed sounding reference signal channel.

7. An apparatus, comprising:
    at least one processor; and
    at least one memory including compute program instructions,
    wherein the at least one memory and computer program instructions are configured to, with the at least one processor, cause the apparatus at least to:
    receive or calculate aperture constraint parameters, wherein the aperture constraint parameters are indicated by a network node in a downlink measurement indication; and apply the aperture constraint parameters to limit uplink precoder candidates for transmission.

8. The apparatus as in claim 7, wherein the aperture constraint parameters are selected based on downlink channel state information.

9. The apparatus as in claim 7, wherein the at least one memory and computer program instructions are further configured to, with the at least one processor, cause the apparatus to apply the aperture constraint parameters, at least to:
restrict beam selections from all available transmit beams in uplink precoder or in uplink component precoder W1 selection.

10. The apparatus as in claim 7, wherein the at least one memory and computer program instructions are further configured to, with the at least one processor, cause the apparatus to apply the aperture constraint parameters, at least to:
increase oversampling size within aperture constraint to improve uplink precoder beam resolution or uplink component precoder W1 beam resolution.

11. The apparatus as in claim 7, wherein the aperture constraint parameters comprise at least one of parameters to constrain uplink aperture size, angles to constrain horizontal antenna direction, and angles to constrain vertical antenna direction.

12. The apparatus as in claim 7, wherein the aperture constraint parameters are applied for a physical uplink shared channel of the apparatus or for a beamformed sounding reference signal channel.

13. An apparatus, comprising:
at least one processor; and
at least one memory including compute program instructions,
wherein the at least one memory and computer program instructions are configured to, with the at least one processor, cause the apparatus at least to:
configure aperture constraint parameters, wherein the aperture constraint parameters are indicated in a downlink measurement indication; and
indicate the aperture constraint parameters to at least one user equipment wherein the aperture constraint parameters cause the at least one user equipment to limit uplink precoder candidates for transmission.

14. The apparatus as in claim 13, wherein the aperture constraint parameters comprise at least one of parameters to constrain uplink aperture size, angles to constrain horizontal antenna direction, and angles to constrain vertical antenna direction.

15. The apparatus as in claim 13, wherein the aperture constraint parameters are to limit W1 anchor beams to a set whose elements are constrained to an angular region.

16. The apparatus as in claim 13, wherein the aperture constraint parameters are for a data channel of the user equipment or for a beamformed sounding reference signal channel.

* * * * *